(12) United States Patent
Hammond

(10) Patent No.: US 8,974,222 B2
(45) Date of Patent: Mar. 10, 2015

(54) NOZZLE-LOCATING INSULATOR HAVING SPRING-NONCONTACT SECTIONS INTERPOSED BETWEEN SPRING-CONTACT SECTIONS

(75) Inventor: Gregory Ray Hammond, Georgetown (CA)

(73) Assignee: Husky Injection Molding Systems, Ltd., Bolton, Ontario ( * ) Notice: Subject to any disclaimer, the term of this patent is extended or adjusted under 35 U.S.C. 154(b) by 94 days.

(21) Appl. No.: 13/819,558

(22) PCT Filed: Jul. 12, 2011

(86) PCT No.: PCT/CA2011/050423
§ 371 (c)(1),
(2), (4) Date: Feb. 27, 2013

(87) PCT Pub. No.: WO2012/027839
PCT Pub. Date: Mar. 8, 2012

(65) Prior Publication Data
US 2013/0156883 A1 Jun. 20, 2013

Related U.S. Application Data

(60) Provisional application No. 61/378,416, filed on Aug. 31, 2010.

(51) Int. Cl.
*B29C 45/27* (2006.01)
*B29C 45/17* (2006.01)

(52) U.S. Cl.
CPC ......... *B29C 45/1781* (2013.01); *B29C 45/2737* (2013.01); *B29C 45/27* (2013.01); *B29C 2045/2759* (2013.01); *B29C 2045/2766* (2013.01)
USPC ........... 425/569; 425/567; 425/568; 425/549; 425/547; 425/562; 425/572

(58) Field of Classification Search
CPC ................ B29C 45/74; B29C 45/2737; B29C 2045/2766
USPC .......... 425/567, 568, 569, 549, 547, 562, 572
See application file for complete search history.

(56) References Cited

U.S. PATENT DOCUMENTS 3,474,701 A * 10/1969 Setzler ............................. 411/8
5,125,827 A * 6/1992 Gellert ........................ 425/549

(Continued)

FOREIGN PATENT DOCUMENTS

EP 0346900 A2 6/1989
JP H278515 A 3/1990

(Continued)

OTHER PUBLICATIONS

European Search Report, Apr. 25, 2014, 6 pages.

(Continued)

*Primary Examiner* — Joseph S Del Sole
*Assistant Examiner* — Lawrence D Hohenbrink, Jr.

(57) ABSTRACT

A nozzle-locating insulator (300), comprising: a body assembly (302), having: a spring-facing surface (304) including: spring-contact sections (306); and spring-noncontact sections (308) interposed between the spring-contact sections (306).

9 Claims, 2 Drawing Sheets

(56) References Cited

U.S. PATENT DOCUMENTS

Figure 1:
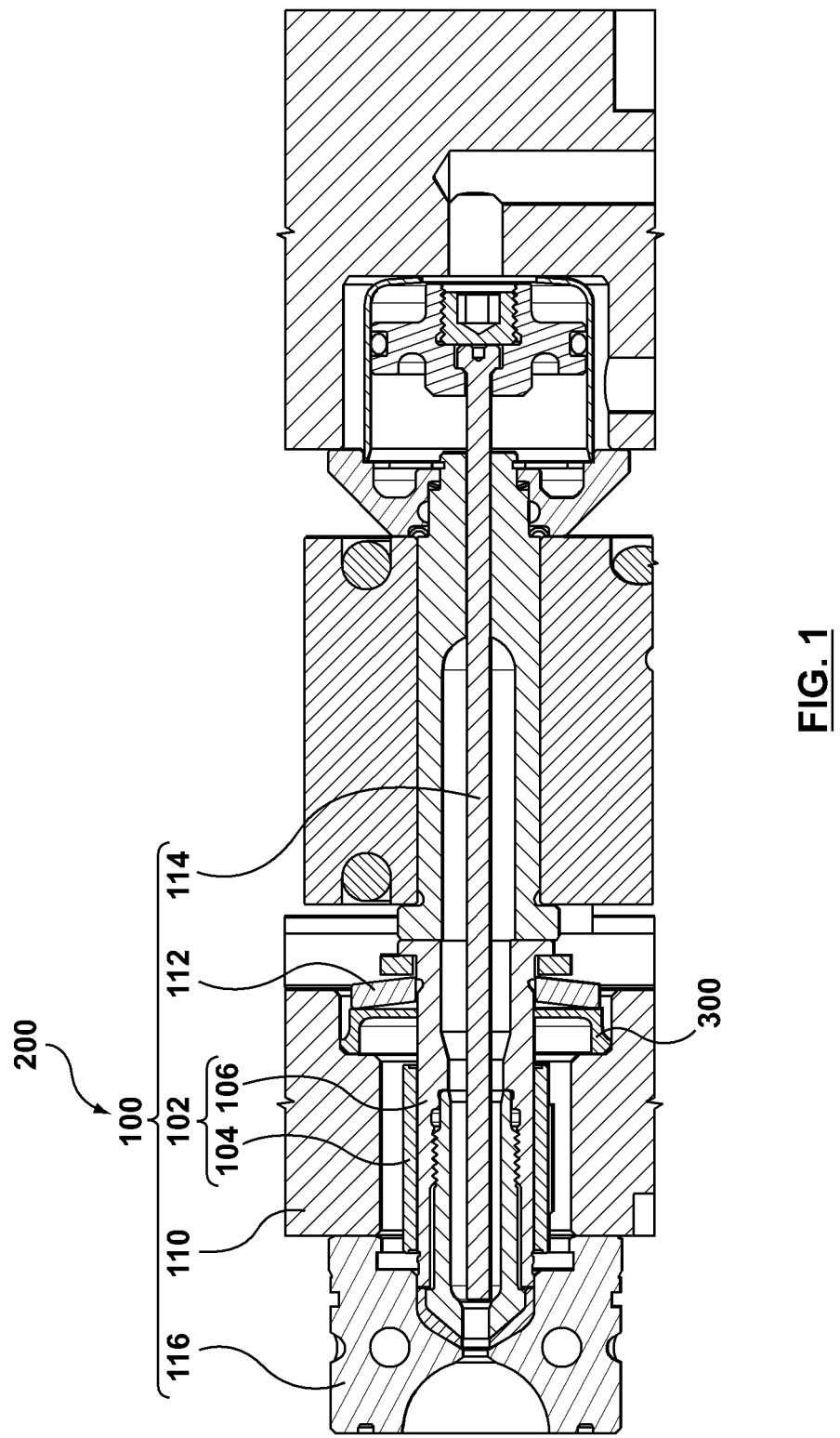

| | | |
|---|---|---|
| 6,890,473 B2 | 5/2005 | Ho et al. |
| 7,244,118 B2 | 7/2007 | Olaru |
| 7,314,367 B2 | 1/2008 | Fairy et al. |
| 7,381,050 B2 | 6/2008 | Fairy |
| 7,467,941 B2 * | 12/2008 | Jenko ............................ 425/564 |
| 2007/0237854 A1 | 10/2007 | Yu |
| 2008/0088047 A1 | 4/2008 | Trudeau |
| 2008/0131553 A1 | 6/2008 | Gaillard et al. |
| 2008/0171100 A1 | 7/2008 | Bouti |
| 2010/0183762 A1 | 7/2010 | Babin |

FOREIGN PATENT DOCUMENTS

| | | |
|---|---|---|
| WO | 0187570 A1 | 11/2001 |
| WO | 2008064458 A1 | 6/2008 |

OTHER PUBLICATIONS

International Search Report, 3 pages, Sep. 16, 2011.

* cited by examiner

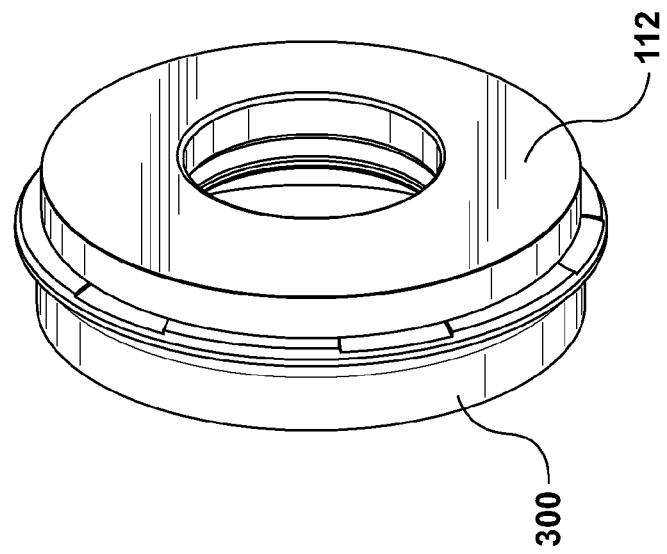
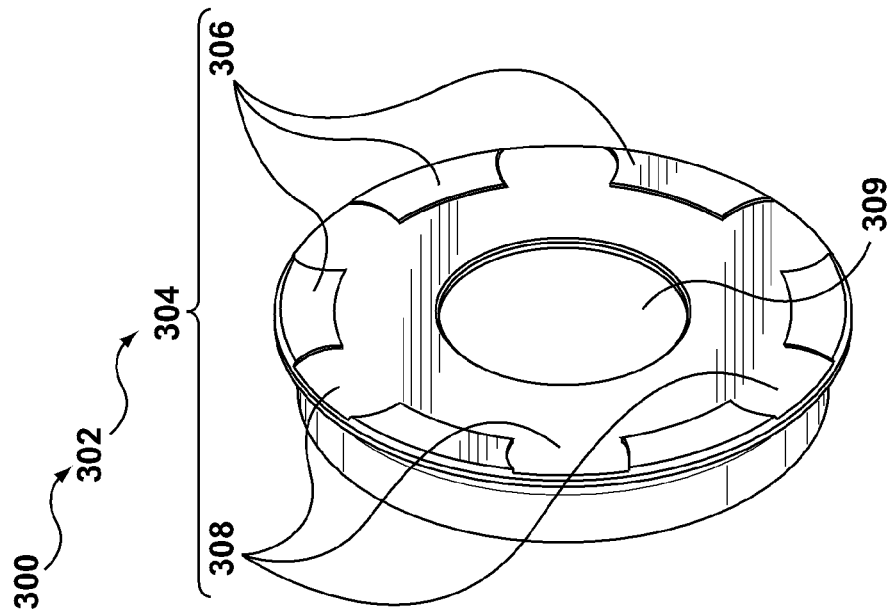
FIG. 2A
FIG. 2B

NOZZLE-LOCATING INSULATOR HAVING SPRING-NONCONTACT SECTIONS INTERPOSED BETWEEN SPRING-CONTACT SECTIONS

TECHNICAL FIELD

An aspect generally relates to (and is not limited to) a nozzle-locating insulator), a mold-tool system having the nozzle-locating insulator, and/or a molding system having the mold-tool system including the nozzle-locating insulator.

BACKGROUND

The first man-made plastic was invented in Britain in 1851 by Alexander PARKES. He publicly demonstrated it at the 1862 International Exhibition in London, calling the material Parkesine. Derived from cellulose, Parkesine could be heated, molded, and retain its shape when cooled. It was, however, expensive to produce, prone to cracking, and highly flammable. In 1868, American inventor John Wesley HYATT developed a plastic material he named Celluloid, improving on PARKES' concept so that it could be processed into finished form. HYATT patented the first injection molding machine in 1872. It worked like a large hypodermic needle, using a plunger to inject plastic through a heated cylinder into a mold. The industry expanded rapidly in the 1940s because World War II created a huge demand for inexpensive, mass-produced products. In 1946, American inventor James Watson HENDRY built the first screw injection machine. This machine also allowed material to be mixed before injection, so that colored or recycled plastic could be added to virgin material and mixed thoroughly before being injected. In the 1970s, HENDRY went on to develop the first gas-assisted injection molding process. Injection molding machines consist of a material hopper, an injection ram or screw-type plunger, and a heating unit. They are also known as presses, they hold the molds in which the components are shaped. Presses are rated by tonnage, which expresses the amount of clamping force that the machine can exert. This force keeps the mold closed during the injection process. Tonnage can vary from less than five tons to 6000 tons, with the higher figures used in comparatively few manufacturing operations. The amount of total clamp force is determined by the projected area of the part being molded. This projected area is multiplied by a clamp force of from two to eight tons for each square inch of the projected areas. As a rule of thumb, four or five tons per square inch can be used for most products. If the plastic material is very stiff, more injection pressure may be needed to fill the mold, thus more clamp tonnage to hold the mold closed. The required force can also be determined by the material used and the size of the part, larger parts require higher clamping force. With Injection Molding, granular plastic is fed by gravity from a hopper into a heated barrel. As the granules are slowly moved forward by a screw-type plunger, the plastic is forced into a heated chamber, where it is melted. As the plunger advances, the melted plastic is forced through a nozzle that rests against the mold, allowing it to enter the mold cavity through a gate and runner system. The mold remains cold so the plastic solidifies almost as soon as the mold is filled. Mold assembly or die are terms used to describe the tooling used to produce plastic parts in molding. The mold assembly is used in mass production where thousands of parts are produced. Molds are typically constructed from hardened steel, etc. Hot-runner systems are used in molding systems, along with mold assemblies, for the manufacture of plastic articles. Usually, hot-runners systems and mold assemblies are treated as tools that may be sold and supplied separately from molding systems.

U.S. Pat. No. 6,890,473 discloses a collar for a hot runner nozzle of an injection molding apparatus includes a generally cylindrical body having a first flange extending inwardly from a first end thereof. The first flange is provided to abut a nozzle head and at least a portion of a nozzle body of a nozzle. An alignment flange projects from an inner wall of the generally cylindrical body and is spaced from the first flange. The alignment flange contacts the nozzle body to restrict tipping of the collar relative to the nozzle during assembly of the injection molding apparatus.

SUMMARY

According to one aspect, there is provided a nozzle-locating insulator (300), comprising: a body assembly (302), having: a spring-facing surface (304) including: spring-contact sections (306); and spring-noncontact sections (308) interposed between the spring-contact sections (306).

According to another aspect, there is provided a mold-tool system (100) having the nozzle-locating insulator (300)

According to yet another aspect, there is provided a molding system (200) having the mold-tool system (100) including the nozzle-locating insulator (300).

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description of the non-limiting embodiments when taken in conjunction with the accompanying drawings, in which:

FIG. 1 depicts a schematic representation of a nozzle-locating insulator (300), a mold-tool system (100) and a molding system (200); and FIGS. 2A and 2B depict other schematic representations of the nozzle-locating insulator (300).

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

FIG. 1 depicts the schematic representation (specifically the cross-sectional view) of the nozzle-locating insulator (300), the mold-tool system (100) and the molding system (200). The mold-tool system (100) may have the nozzle-locating insulator (300). The molding system (200) may have the mold-tool system (100). It will be appreciated that the nozzle-locating insulator (300), the mold-tool system (100) and the molding system (200) may be sold separately or provided by a single vendor. The molding system (200) includes, for example, a platen assembly (not depicted but know) having a stationary platen and a movable platen. The mold-tool system is supported by the platen assembly of the molding system. The nozzle-locating insulator (300), the mold-tool system (100) and the molding system (200) each may include (but not limited to) components that are known to persons skilled in the art, and these known components will not be described here; these known components are described, at least in part, in the following reference books (for example): (i) *"Injection Molding Handbook"* authored by OSSWALD/TURNG/GRAMANN (ISBN: 3-446-21669-2), (ii) *"Injection Molding Handbook"* authored by ROSATO AND ROSATO (ISBN: 0-412-99381-3), (iii) *"Injection Molding Systems"* 3$^{rd}$ Edition authored by JOHANNABER (ISBN 3-446-17733-7) and/or (iv) *"Runner and Gating Design Handbook"* authored by BEAUMONT (ISBN 1-446-22672-9). It will be appreciated that for the purposes of this document, the phrase "includes (and is not limited to)" is equivalent to the word "comprising". The word "comprising" is a transitional phrase or word that links the preamble of a patent claim to the specific elements set forth in the claim which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

FIGS. 2A and 2B depict other schematic representations of the nozzle-locating insulator (300). The nozzle-locating insulator (300) includes (and is not limited to): a body assembly (302) that includes (and is not limited to) a spring-facing surface (304). The spring-facing surface (304) includes (and is not limited to): (i) spring-contact sections (306), and (ii) spring-noncontact sections (308) that are interposed between the spring-contact sections (306). For the case where the mold-tool system (100) has the nozzle-locating insulator (300), then the mold-tool system (100) may include (and is not limited to): (i) a molding-nozzle assembly (102); and (ii) a spring assembly (112). The body assembly (302) of the nozzle-locating insulator (300) may define a central passageway (309) that is configured to receive the molding-nozzle assembly (102). The spring-contact sections (306) of the spring-facing surface (304) contact the spring assembly (112). The spring-noncontact sections (308) of the spring-facing surface (304) may be set apart from the spring assembly (112) so that there is no contact or reduced contact between the spring assembly (112) and the spring-noncontact sections (308). The spring-noncontact sections (308) reduce (and/or eliminate at least in part) surface contact with a spring assembly (112) so that thermal losses are reduced from the molding-nozzle assembly (102) through the nozzle-locating insulator (300) and the spring assembly (112). The molding-nozzle assembly (102) may include a nozzle housing (106) and a heater (104) that is attached to the nozzle housing (106). The nozzle-locating insulator (300) may be made of titanium with raised surfaces on an outside flat surface that the spring assembly (112) may be in contact with. The spring-contact sections (306) may be referred to as raised surfaces that are located on an outside flat surface of the nozzle-locating insulator (300). The spring-noncontact sections (308) are interposed between the spring-contact sections (306) so that the spring-contact sections (306) create a reduced surface contact area with the spring assembly (112) thus reducing thermal losses from the molding-nozzle assembly (102) through the nozzle-locating insulator (300) and the spring assembly (112) to a manifold plate (110). The mold-tool system (100) may also include known components such as but not limited to: a mold gate (116) and a stem (114). The advantage of the nozzle-locating insulator (300) is reduced heat transfer, in use, from the molding-nozzle assembly (102) through the nozzle-locating insulator (300) and the spring assembly (112) to the manifold plate (110).

It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising". It is noted that the foregoing has outlined the non-limiting embodiments (examples). The description is made for particular non-limiting embodiments (examples). It is understood that the non-limiting embodiments are merely illustrative as examples.

What is claimed is:

1. A nozzle-locating insulator (300) for reducing thermal loss from a molding-nozzle assembly of a molding system, comprising:
   a body assembly (302), having:
      a spring-facing surface (304) including:
         a plurality of spring-non-contact sections; and
         a plurality of spring-contact sections (306) raised from the spring-non-contact sections for contacting a spring assembly in a mold-tool system,
         wherein the spring-contact sections and the spring-non-contact sections being alternately adjacent to each other along an outer circumferential edge of the spring-facing edge.

2. A mold-tool system (100) having a nozzle-locating insulator (300) for reducing thermal loss from a molding-nozzle assembly of a molding system, the mold-tool system (100) comprising:
   a molding-nozzle assembly (102), wherein the molding-nozzle assembly comprises a nozzle housing;
   a spring assembly (112);
   a body assembly (302) defining a central passageway (309) is configured to receive the molding-nozzle assembly (102) therethrough, the body assembly having:
      a spring-facing surface including:
         a plurality of spring-non-contact sections;
         a plurality of spring-contact sections raised from the spring-non-contact sections for contacting a spring assembly in a mold-tool system;
         wherein the spring-contact sections and the spring-non-contact sections being alternately adjacent to each other along an outer circumferential edge of the spring-facing edge,
   wherein the spring assembly operates between a portion of the nozzle housing and the body assembly.

3. A molding system (200) having the mold-tool system (100) of claim 2.

4. The nozzle-locating insulator of claim 1, wherein the one or more spring-contact sections comprise six spring-contact sections separated by one or more spring-no-contact sections.

5. The nozzle-locating insulator of claim 1, wherein the nozzle-locating insulator defines a central passageway configured to receive the molding-nozzle assembly and wherein the spring assembly operates between the molding-nozzle assembly and the body assembly of the nozzle-locating insulator.

6. The nozzle-locating insulator of claim 1, wherein the body assembly is made of titanium.

7. The nozzle-locating insulator of claim 1, wherein the one or more spring-non-contact sections is planar and each of the spring-contact sections is planar.

8. The nozzle-locating insulator of claim 1, wherein the plurality of spring-non-contact sections defines insulating air gaps with the spring assembly when the spring assembly is in contact with the plurality of spring-contact sections.

9. The mold-tool system of claim 2 wherein the plurality of spring-non-contact sections and the spring assembly define insulating air gaps therebetween.

\* \* \* \* \*